2,596,057

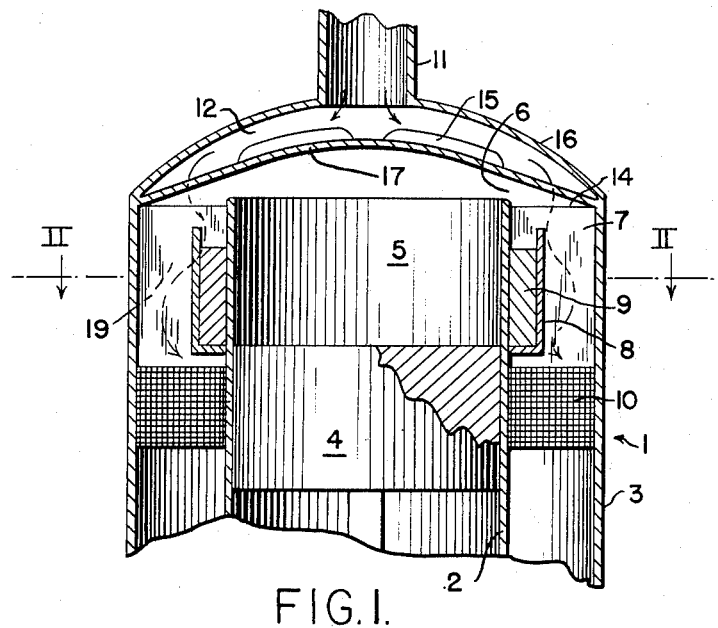
FIG.I.
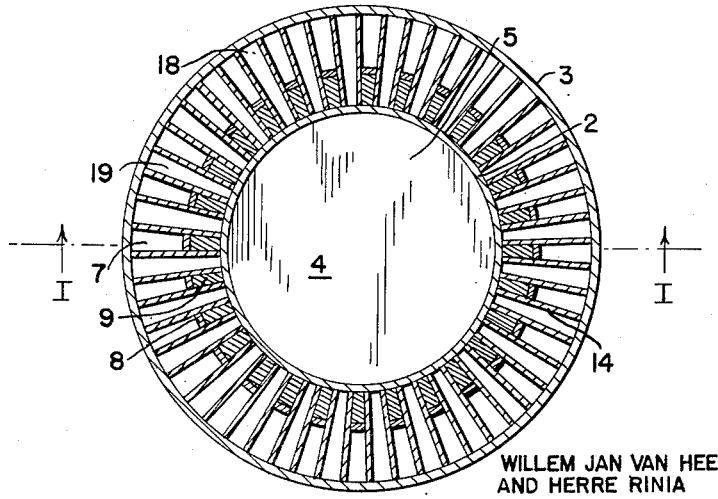
FIG.2.
INVENTORS
WILLEM JAN VAN HEECKEREN
AND HERRE RINIA Patented May 6, 1952

UNITED STATES PATENT OFFICE 2,596,057

METHOD AND APPARATUS FOR TEMPORARILY INCREASING THE POWER OF HOT-GAS ENGINES

Willem Jan van Heeckeren and Herre Rinia, Eindhoven, Netherlands, assignors to Hartford National Bank & Trust Co., Hartford, Conn., as trustee Application September 4, 1945, Serial No. 614,447
In the Netherlands May 27, 1943

Section 1, Public Law 690, August 8, 1946
Patent expires May 27, 1963

9 Claims. (Cl. 60—24)

This invention relates to a method of temporarily increasing the power of a hot-gas engine over and above the full load power capacity normally available from the source of heat of the engine. The term "full-load capacity" is to be understood to mean here the maximum power which the engine can deliver under the operating conditions for which the source of heat of the engine is designed. The expression "maximum power of the source of heat" is to be understood to mean here the maximum load at which the fuel and combustion air supplied to the source of heat ensure as complete a combustion as possible, at which no undesirable fuel parts or ingredients follow the flame path and at which the members of the combustion device are not heated in excess of a continuously admissible temperature.

For some purposes, for example, when using a hot-gas engine as a prime mover for traction purposes, it may be desirable to temporarily obtain from the motor a power in excess of the normal full-load capacity of the heat source. For example when starting and accelerating a vehicle a high power is required for short intervals only, i. e., of the order of some few seconds up to fractions of a minute and to take into account such temporary loads requires the use of an unfeasibly large heat supply.

According to the present invention, it is possible temporarily to overload a hot-gas engine beyond the normal capabilities of its heat supply, by withdrawing the excess-heat required from the material of the heater. While as a result of the overload the temperature of the material of the heater drops, this overload is of limited duration only. This must be succeeded by a period of lower operating power, during which time the temperature of the material rises to its original value. The conversion of the heat accumulated in the heater material into energy may even be applied to instances where the heat developed by the source is temporarily too low for the power required for example, in instances where the capacity of the source of heat is reduced temporarily or even becomes nil, for instance during the cleaning of the fire.

All parts of the heater material having substantially identical temperature and having the heat supplied to them direct or indirect from the source of heat and transmitting this heat direct or indirect to the operating gas medium are particularly adapted to supply the material of the heater from which the heat required in the case of overload may be withdrawn. Thus, for example, not only the wall of the cylinder at the area of the heater, but also the wall of the pipes of the heater and, if required, the ribs fitted inside or outside the heater to improve the heat transmission, may be employed to supply the required heat. If the conveyance of heat from the source of heat to the operating medium is effected by means of a heat conveying medium, such as a liquid, a liquid metal, a volatilizing and condensing substance, or the like, the required heat may be withdrawn from this medium.

In addition, according to a further embodiment of the invention, it is possible to withdraw this heat from a liquid which solidifies at a temperature slightly below the normal operating temperature of the heater, which liquid is in continuous thermal contact with this heater and which is housed, for instance, in an enclosure in the heater assembly. Even in the case of a slight drop in temperature of the heater material owing to the withdrawal of heat being in excess of the heat supply, the liquid in contact with it solidifies, the heat of solidification being rejected at a constant temperature. If, after the solidification of this heat accumulating liquid further heat is required, this can be supplied by a drop of temperature of the heater material jointly with the solidified liquid. Apart from a materially smaller total drop of temperature and consequently a smaller reduction of the output, this form of construction has, moreover, the advantage that the engine can be made ready for use even before the solidified liquid has melted.

The organization and method of operation of a hot-gas engine employing the heat accumulator of the present invention may best be understood from a description of a specific embodiment when taken in connection with the accompanying drawing in which:

Figure 1 is a diagrammatic representation of a vertical section taken on the line I—I in Figure 2, of the top portion of a conventional hot-gas engine cylinder in the vicinity of the hot chamber and showing an embodiment of the heat accumulator of the persent invention applied thereto; and Fig. 2 is a horizontal cross-sectional view of the hot-gas engine cylinder taken on the line II—II in Figure 1.

Referring to the drawing, the top portion of a hot-gas engine cylinder I comprises an external casing 3 having a dome portion 16. The walls 2 of a concentric cylinder house the displacer element 4 and define therewith and together with an inner dome portion 17, the hot chamber 5. Hot chamber 5 communicates with an annular heat exchanger 18 via passageways 6. Radial walls 14 define alternate conduits 7 with which passageways 6 specifically communicate in the heat exchanger 18. Conduits 19 alternate between conduits 7 to complete the heat exchanger and the former conduits are in communication with the chamber 12 defined between dome portion 16 and 17. The hot combustion gas path in conduits 19 in the heat exchanger is indicated by the wavy dotted line arrow in Fig. 1. Chamber 12 receives hot combustion gases via conduit 11 from a burner (not shown). Mounted on dome portion 17 are fins 15 to enhance the heat exchange between the combustion gases and the medium in chamber 5. Located in the conduits 7 and mounted on the walls 2 are receptacles 8 having walls of high heat conductivity. It is necessary that the receptacles be of material having a fusion point higher than the operating temperatures as well. In the receptacles are metal masses 9 according to the invention which melt at the normal running temperatures of the engine. On momentary excess power demands, the engine withdraws heat stored in the molten metal masses as heat of solidification as explained hereinbefore.

The hot-gas engine to which the method according to the invention can be applied must be possessed of an adequate quantity of heat accumulated in the heater material. As stated hereinbefore, the energy in excess of that corresponding with the normal full-load capacity is withdrawn from this accumulated quantity of heat, owing to which the temperature of the heater material drops. This drop in temperature brings about a coresponding change in the thermal efficiency which in the ideal case is equal to $$\frac{T1-T2}{T1}$$

in which $T1$ designates the temperature of the operating medium in the hot chamber of the hot-gas engine and $T2$ the temperature of this medium in the cold chamber of the engine, expressed in Kelvin degrees. Now, if in consequence of the withdrawal of heat, the temperature of the heater material drops, the temperature $T1$ of the operating medium will drop as well. Further, the quantity of withdrawn heat or in other words the drop in temperature, is proportionate to the overload i. e. to the energy in excess of that corresponding to the normal full-load capacity.

According to the present invention, the hot-gas engine must be constructed in such a manner that the quantity of heat accumulated in the heater material suffices at least to furnish an overload of 2% of the normal energy output per hour of the engine at a drop of the total thermal efficiency of at the most down to 90% of the total thermal efficiency of the engine at full-load.

By adhering to the minimum requirements above described a practically adequate possibility of overloading the engine is secured. The limit set to the drop of the thermal output is such that after the overload is removed the power of the engine still suffices. A further drop of the temperature of the heater material would allow a higher overload, but this would result in that after removal of the overload the normal power would have become practically too low for the serviceability of the engine due to the enormous drop of the thermal efficiency.

In order that the invention may be clearly understood and readily carried into effect, it will now be explained more fully with reference to one form of construction given hereinafter by way of example.

For simplicity, instead of using the total thermal efficiency use will be made in the following calculation of the ideal theoretical thermal relationship $$\frac{T1-T2}{T1}$$

which owing to essential divergences from the isothermal process and owing to losses that are not dependent upon the temperature to any great extent (gas and mechanical friction, radiation and conduction losses) is not directly proportional to the total thermal output; divergences are, however, not great in the case of full-load and the example becomes more simple in this way. When checking the operation of a hot-gas engine with regard to the use of the method according to the invention, use is made of the total thermal efficiency and this is calculated by measuring the fuel expenditure and the developed output.

Assuming an engine having a power of 500 watts and a temperature of the heater material at normal load of 700° C. The temperature of the cooler is assumed to be 70° C. At this temperature the theoretical thermal efficiency is:

$$\frac{[700+273]-[70+273]}{700+273}=64.5\%$$

A drop of the output down to not less than 90% is allowed, so that after overload the output must be not less than $$0.9\times0.645=58\%$$

From this follows a temperature of the heater material of at least 820° Kelvin or else 547° C. The permissible temperature drop of the heater material is consequently 700−547=153° C. The heat set free by this fall in temperature of the heater material is used for the overload and must consequently not be less than 2% of the power output per hour. The latter power of the engine is 500 watts per hour=430 kilogram-calories. For overload there must consequently be available 2% of this or else 8.6 kilogram-calories. This power must be furnished at a mean efficiency of $$\frac{0.645+0.58}{2}$$

(61.25%) by 14 kilogram-calories of heat. Supposing the heater material to be made from bronze having a specific heat of 0.1 kilogram-calories per kilogram per °C., the weight of the heater must consequently be $$\frac{14}{0.1\times153}=\text{about } 0.92 \text{ kg.}$$

This material may be distributed about the walls of the heating pipes, the wall of the cylinder at the area of the heater and, if the case may be, the ribs on the outside of the heater in the flue gas pipes.

The overload allowed under the given conditions of at least 2% of the normal power output implies, for example, that for 0.01 hour (36 seconds) the engine can produce 1+1/0.01×0.02= three times the normal full-load capacity. Similarly, for example for 0.02 hour (72 seconds) 1+1/0.02×0.02=double the normal full-load capacity can be produced.

In the case of a lower drop in temperature than that calculated hereinbefore the quantity of accumulated heat may be housed in a substance which is in thermal connection with the heater and whose melting point is just below the operating temperature of the heater. In the present case, in which the operating temperature is assumed to be 700° C., a quantity of potassium iodide may be used to constitute the heat accumulator. The melting point of this metal salt lies between 680° and 690° C. The melting heat per kilogram is about 55 kilogram-calories. The heat required for overload (about 14 kilogram-calories) may now become available as follows: by drop in temperature of the bronze of the heater (700—685)×0.92×0.1=/1.4 kilogram-calories; the other 13 kilogram-calories approximately are furnished by the heat of solidification of 13/55=/0.43 kg. of potassium iodide.

In reality the conditions in this form of construction are slightly more favourable, because this amount of heat is furnished at a drop in temperature of 15° C. instead of at 193° C., so that the output has finally not dropped to 58% but to 64%. If the permissible drop down to 0.9 of the original output is assumed to be maintained, the quantity of bronze of the heater may consequently be materially smaller. As heat accumulating metals for this purpose we may still mention: aluminium, melting point 660° C., melting heat 93 kilogram-calories per kg.; antimony, melting point 630° C., melting heat 39 kilogram-calories per kg.; and magnesium, melting point 651° C., melting heat 73 kilogram-calories per kg.

As to these metals Mg is the most suitable on account of its low tendency to form alloys.

When the engine is put into operation, the cycle of operations may start even at 685° C., consequently at an output of 64%, without the need for the heat required for the accumulator to be supplied at the outset. This heat may be accumulated in a period of time in which the engine need not produce its full output.

What we claim is:

1. The method of operating a hot-gas engine, comprising the steps of supplying heat to said engine at a predetermined temperature to fulfill normal operating requirements of the engine, heat-liquefying at said temperature a solid material which is in thermal exchange relationship with said engine, said material having a melting point just below said predetermined temperature, and exchanging heat of solidification from said material to said engine during overload conditions of said engine.

2. The method of operating a hot-gas engine, comprising the steps of supplying heat to said engine at a predetermined temperature to fulfill normal operating requirements of the engine, heat-liquefying a material having a melting point in the range of about 500° C. to 700° C. and just below said predetermined temperature to provide an auxiliary heat source in thermal exchange relationship with said engine, and exchanging heat from said auxiliary source to said engine during overload conditions of the engine.

3. The method of operating a hot-gas engine, comprising the steps of supplying heat at a given temperature greater than 500° C. to said engine to fulfill normal operating requirements of the engine, heat-liquefying a material having a melting point just lower than said given temperature and greater than about 500° C. to provide an auxiliary heat source in thermal exchange relationship with said engine, and exchanging heat from said auxiliary source to said engine during overload conditions of the engine and solidifying said material.

4. A hot-gas engine adapted to be loaded to an extent greater than the normal full load of the engine by withdrawal of energy from the thermal energy accumulated in the material of the heater of the engine, in which said heater comprises a space containing a substance the melting point of which is slightly below the normal operating temperature of the material of said heater.

5. A hot-gas engine comprising a heater assembly, means forming an enclosure within said heater assembly, and heat storage means in said enclosure, said heat storage means comprising a heat-liquefiable material having a melting temperature greater than about 500° C. and less than the melting temperature of said heater.

6. A hot-gas engine comprising a heater assembly, means forming an enclosure within said heater assembly, and a mass of potassium iodide constituting heat storage means within said enclosure.

7. A hot-gas engine comprising a heater assembly, means forming an enclosure within said heater assembly, and a mass of magnesium constituting heat storage means within said enclosure.

8. A hot-gas engine comprising a heater assembly, means forming an enclosure within said heater assembly, and a mass of aluminum constituting heat storage means within said enclosure.

9. A hot-gas engine comprising a heater assembly, means forming an enclosure within said heater assembly, and a mass of antimony constituting heat storage means within said enclosure.

WILLEM JAN VAN HEECKEREN.
HERRE RINIA.

REFERENCES CITED

The following references are of record in the file of this patent:

UNITED STATES PATENTS

| Number | Name | Date |
|---|---|---|
| 278,446 | McDonough | May 29, 1883 |
| 1,877,762 | Griswold | Sept. 20, 1932 |
| 1,890,429 | Griswold | Dec. 6, 1932 |
| 1,922,509 | Thurm | Aug. 15, 1933 |

FOREIGN PATENTS

| Number | Country | Date |
|---|---|---|
| 12,006 | Great Britain | Dec. 22, 1847 |
| 2,225 | Great Britain | Sept. 12, 1864 |
| 366,528 | Great Britain | Feb. 1, 1932 |